United States Patent [19]

Fregnan

[11] Patent Number: 4,949,631
[45] Date of Patent: Aug. 21, 1990

[54] DEVICE FOR WHIPPING MILK DESIGNED TO BE CONNECTED TO THE CONVENTIONAL STEAM NOZZLE OF AN EXPRESSO COFFEE MACHINE FOR THE PREPARATION OF ITALIAN CAPPUCCINO COFFEE

[75] Inventor: Florindo Fregnan, Dosson, Italy

[73] Assignee: Fregnan Florindo—Costruzions Macchine de Caffe Elektra, Dosson, Italy

[21] Appl. No.: 416,157

[22] Filed: Oct. 2, 1989

[30] Foreign Application Priority Data

Oct. 20, 1988 [IT] Italy ................... 3629 A/88

[51] Int. Cl.5 ............. A01J 1/04; A23C 9/00
[52] U.S. Cl. ..................... 99/452; 99/453; 261/DIG. 26
[58] Field of Search ......... 99/293, 294, 452, 453, 99/304, 305, 306, 323.1, 323.3, 275, 454; 261/76, 78.2, DIG. 16, DIG. 26, DIG. 76; 366/163, 165, 101, 176; 222/145, 132; 426/433, 474; 239/428, 434.5, 434, 433

[56] References Cited

U.S. PATENT DOCUMENTS

| 1,430,303 | 9/1922 | Hartman | 261/76 |
| 2,060,557 | 11/1936 | Davis | 99/452 X |
| 2,375,833 | 5/1945 | Urquhart | 261/DIG. 26 X |
| 2,766,026 | 10/1956 | Boyd | 261/76 |
| 2,919,726 | 1/1960 | Zimmermann et al. | 261/DIG. 26 X |
| 4,620,953 | 11/1986 | Silla et al. | 261/DIG. 16 X |
| 4,715,274 | 12/1987 | Paoletti | 99/452 X |
| 4,735,133 | 4/1988 | Paoletti | 99/323.1 X |
| 4,852,474 | 8/1989 | Mahlich et al. | 99/293 |

Primary Examiner—Harvey C. Hornsby
Assistant Examiner—Scott J. Haugland
Attorney, Agent, or Firm—Herbert Dubno

[57] ABSTRACT

A device for taking milk by creating a vacuum in its container and supplying it already whipped directly to the cup for the preparation of Italian cappuccino coffee in combination with the steam nozzle of an expresso coffee machine. A device of this type comprises a tubular body having an inner conical seat in the vicinity of one end with which the output conical surface of an injector cooperates to form a space, the injector being extended in the form of a rod provided with splash-guard members up to the opposite end of the tubular body for leak-tight connection with the steam nozzle and with the tubular body. An air intake upstream of the splash-guard members and a rubber connection for taking the milk from the container are disposed to communicate with the space while at the downstream end of the conical seat there are disposed two coaxial nozzles forming a space via which the milk is whipped and discharged.

7 Claims, 1 Drawing Sheet

U.S. Patent    Aug. 21, 1990    4,949,631
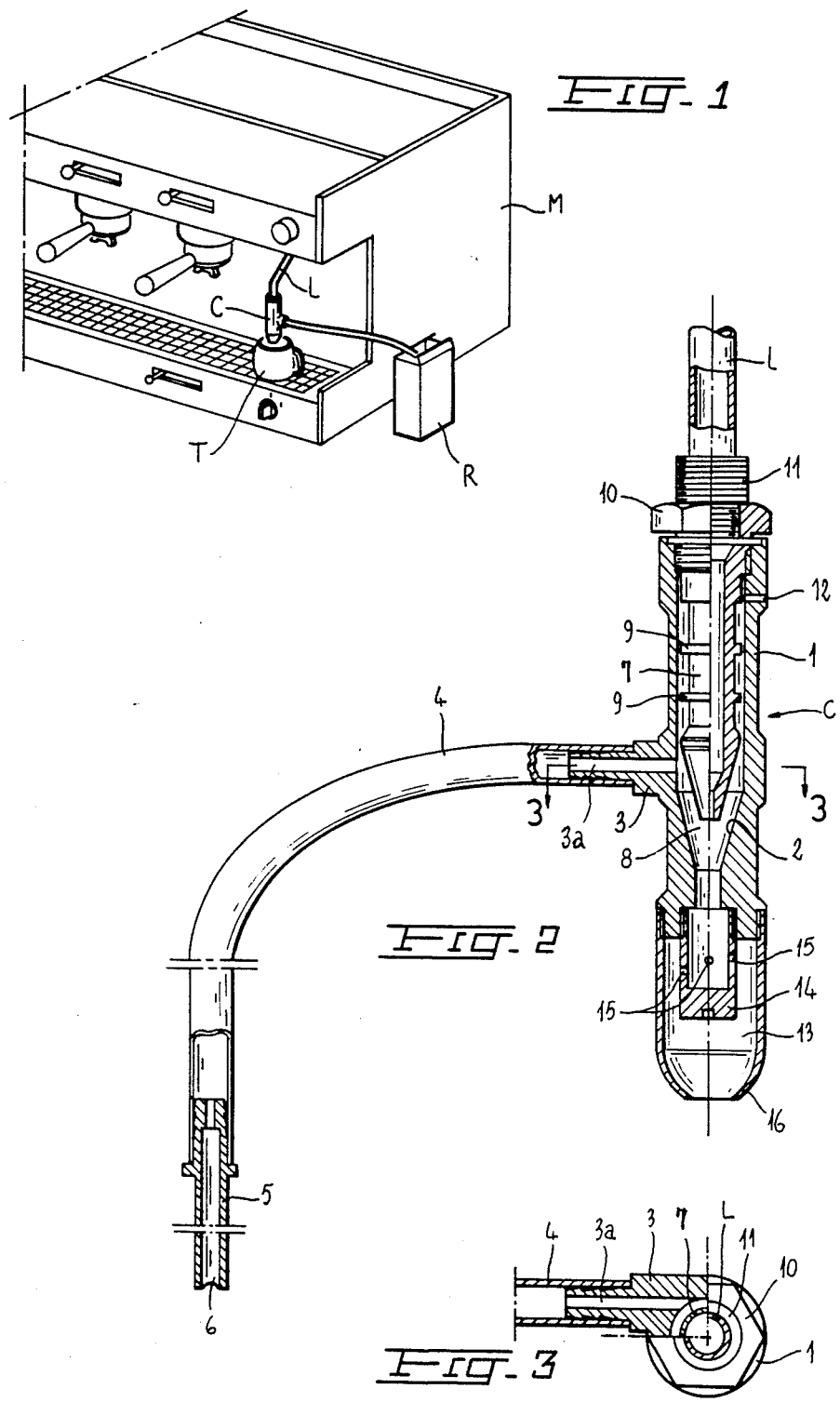

DEVICE FOR WHIPPING MILK DESIGNED TO BE CONNECTED TO THE CONVENTIONAL STEAM NOZZLE OF AN EXPRESSO COFFEE MACHINE FOR THE PREPARATION OF ITALIAN CAPPUCCINO COFFEE

SUMMARY OF THE INVENTION

The present invention relates to a device for whipping milk designed to be connected to the conventional steam nozzle of an expresso coffee machine for the preparation of italian cappuccino coffee.

The device for whipping milk is more particularly of the type in which the milk is taken up by creating a vacuum in the recipient containing the milk and the milk is supplied already whipped to the cup.

This device, intend to take up the milk by creating a vacuum in a recipient containing it and to supply it already whipped directly to the cup, is connected with the conventional steam nozzle of an expresso coffee machine for the preparation of italian cappuccino coffee and is of the type comprising a tubular body having an inner conical seat with which the outer conical surface of an injector cooperates to define therewith an annular space which communicates, via an air intake, with atmosphere and with a rubber connection borne laterally by the tubular body, a tube provided with a suction member having a calibrated duct which can be inserted in the milk container being connected to the rubber connection, and is characterized in accordance with the present invention in that the conical seat is provided in the vicinity of one end of the tubular body, in that the injector is extend in the form of a rod provided with splash-guard members up to the opposite end of the tubular body for leak-tight connection with the steam nozzle and with the tubular body, in that the air intake is provided upstream of the splash-guard members with respect to the direction of delivery of the steam through the injector and in that at the downstream end of the conical seat of the tubular body an inner nozzle with multiple flow-breaking holes and externally to the latter a nozzle with a flow guide jacket for conveying and discharging the milk whipped in this way into and along the gap to the cup are associated coaxially with the conical seat and form a space between one another.

BRIEF DESCRIPTION OF THE DRAWINGS

Further characteristics and advantages of the device of the invention will be set out in the following detailed description of a preferred embodiment thereof, given purely by way of example, with reference to the attached drawings, in which:

FIG. 1 is a diagrammatic perspective view of an expresso coffee machine with the device of the invention connected to the corresponding steam nozzle;

FIG. 2 is an axial vertical sectional view through the device in question on an enlarged scale;

FIG. 3 is a cross-section through this device along line A—A of FIG. 2.

DETAILED DESCRIPTION OF THE INVENTION

As mentioned above, FIG. 1 shows the device C in question connected to the steam nozzle L of a conventional expresso coffee machine M.

The device C of the presente invention comprises a tubular body 1 provided internally with a conical seat 2 in the vicinity of one end, i.e. the lower end in the position of use (see FIGS. 1 and 2), and provided laterally with a connection member, called a rubber connection, 3 to which one end of a tube 4 is connected, the other end of this tube being provided with a replaceable suction member 5 having a calibrated duct 6 which can be inserted in the milk container R (see FIG. 1) from which the milk is taken by vacuum and whipped to provide an italian cappuccino coffee in the cup (see FIG. 1).

The outer conical surface of an injector 7 cooperates with the conical seat 2 of the tubular body 1 so as to define therewith an annular space 8. The injector 7 is extended, in accordance with the invention, in the form of a rod provided with annular splash-guard members 9 and terminates externally to the tubular body 1 in the form of a threaded cap 10 which can be screwed in a leak-tight manner into the corresponding threaded end of the tubualr body 1. A threaded cap 10 of this type is also provided with an inner axial thread so that a threaded connection member 11 associated with the steam nozzle L of the expresso coffee machine M can be screwed therein in a leak-tight manner.

The duct 3a of the rubber connection 3 opens into the space 8 at the level of the outer conical surface of the injector 7 while an air intake formed by a calibrated hole 12 is provided in the tubular body 1 upstream, with respect to the direction of supply of the steam through the injector 7, of the annular splash-guard members 9.

At the lower end opposite to the end connected to the steam nozzle L of the tubular body 1, an inner cylindrical nozzle 14 with multiple radial flow-breaker holes 15 and externally thereto a nozzle with a flow guide jacket 16 for conveying and discharging the whipped milk into and along the space 13 into the cup T (FIG. 1) are connected coaxially with the conical seat 8 and with one another to form a space 13.

According to the present invention the injector 7 is provided with a nonstick material on the its external surface, while inner cylindrical nozzle 14 and nozzle with a flow guide jacket 16 are provided "tefloned" both on the internal and external surface. The nonstick material may be "Teflon".

It is sufficient with the device of the invention described above to use the steam available from a conventional expresso coffee machine in such a way that as it passes through the injector 7 it creates a vacuum designed to suction milk from its conteiner R into the space 8 via the rubber connection 3 and the tube 4 with the suction member 5-6, and air via the air intake with a calibrated hole 12 so as to supply, via the hole 15 of the inner nozzle 14, a mixture of the milk, air and steam into the space 13, from which it is discharged into the cup in the form of milk and dense frothy cream which is durable and at the correct temperature to make Italian cappuccino coffee.

In addition to its particular efficiency in providing whipped milk with a high percentage of durable frothy cream, it should be noted that the device for whipping milk is particularly efficient since it provides the possibility of locating the air intake away from any possible blockages which may be located upstream of the annular splash-guard members 9 provided on the rod estension of the steam injector 7.

The description of the device of the invention made with reference to the attached drawings is obviously given solely by way of example and it is therefore evident that any modifications and variants suggested by practice and by its embodiment and use can be made thereto provided that they are within the scope of the attached claims.

I claim:

1. A device, for taking up milk from a container by creating a vacuum in the container and supplying it already whipped directly to a cup, connected to a steam nozzle of an expresso coffee machine for the preparation of Italian cappuccino coffee, the device comprising a tubular body having an inner conical seat and a laterally extending tubing connector, an injector having an outer conical surface cooperating with the seat to define therewith an angular space, an air inlet communicating with the annular space, with atmosphere, and with the tubing connecting, a tube provided with a suction member having a calibrated duct which can be inserted in the milk container being connected to the tubing connector, characterized in that the conical seat is provided in the vicinity of one end of the tubular body, in that the injector has a rod-shaped portion provided with splash-guard members extending up to the opposite end of the tubular body for leak-tight connection with the steam nozzle and with the tubular body, and in that the air inlet is provided upstream of the splash-guard members with respect to the direction of delivery of the steam through the injector, the device further comprising an inner nozzle with multiple flow-breaking holes and externally thereto an outer nozzle with a flow guide jacket both located at the end of the tubular body downstream of and coaxial with the conical seat and forming a space therebetween for conveying and discharging the milk in a whipped state through the space into the cup.

2. A device as claimed in claim 1, characterized in that the splash-guard members are annular members axially spaced from one another along the rod-shaped portion of the injector.

3. A device as claimed in claim 1, characterized in that the air inlet is formed by a calibrated hole provided radially in the tubular body.

4. A device as claimed in claim 1, characterized in that the inner nozzle with multiple flow-breaking holes has an outer cylindrical surface with the holes provided radially all around the surface.

5. A device as claimed in claim 1, characterized in that the outer nozzle with the flow guide jacket is cylindrical and tapers into a nose at its end.

6. A device as claimed in claim 1, characterized in that the tubing connector is provided tangentially with respect to the tubular body.

7. A device as claimed in claim 1, characterized in that said injector is provided with a nonstick material on the its external surface and said inner nozzle and said outer nozzle with the flow guide jacket are provided with a nonstick material both on their internal and external surfaces.

* * * * *